United States Patent [19]

Stilley

[11] Patent Number: 5,259,019
[45] Date of Patent: Nov. 2, 1993

[54] APPARATUS PROVIDING FOR A CURVED DEVICE WITH HINGED COVER

[75] Inventor: Russell L. Stilley, Dallas, Tex.

[73] Assignee: Texas Instruments Incorporated, Dallas, Tex.

[21] Appl. No.: 939,564

[22] Filed: Sep. 2, 1992

Related U.S. Application Data

[63] Continuation of Ser. No. 682,804, Apr. 8, 1991, abandoned.

[51] Int. Cl.⁵ .................. H04M 11/00; H04M 1/00
[52] U.S. Cl. .................................. 379/58; 379/61;
 379/428; 379/433; 379/440
[58] Field of Search ............... 379/56, 58, 419, 428,
 379/433, 440, 61; 455/89, 90

[56] References Cited

U.S. PATENT DOCUMENTS

| 4,845,772 | 7/1989 | Metroka et al. | 379/61 |
| 4,856,045 | 8/1989 | Hoshina | 379/53 |
| 5,027,394 | 6/1991 | Ono et al. | 379/434 |
| 5,111,503 | 5/1992 | Takagi | 379/433 |
| 5,117,073 | 5/1992 | Mischenko | 379/433 |
| 5,148,471 | 9/1992 | Metroka et al. | 379/58 |
| 5,197,091 | 3/1993 | Takagi et al. | 379/58 |

FOREIGN PATENT DOCUMENTS

| 0309341 | 3/1989 | European Pat. Off. | 379/428 |
| 0288549 | 11/1988 | Japan | 379/428 |
| 0089845 | 4/1989 | Japan | 379/428 |
| 0319348 | 12/1989 | Japan | 379/440 |

OTHER PUBLICATIONS

Wayside Telephone, Oct. 14, 1910.
Tandy Corporation, "Cordless Electronic Telephone", Cat #43-555, Oct. 1983.
Panasonic, "Cordless Phone Model #KX-T3000", Sep. 1988.

Primary Examiner—Jin F. Ng
Assistant Examiner—William D. Cumming
Attorney, Agent, or Firm—Thomas G. Eschweiler; James C. Kesterson; Richard Donaldson

[57] ABSTRACT

A curved apparatus which remains stable when placed on a substantially flat surface is shown which has a base portion with an arcuately shaped back surface capable of resting on the substantially flat surface, a hinge rotatably fixed to the base portion, and a cover secured to the hinge and rotatable therewith, to prevent rocking of the base portion when the base portion's front surface is touched while the base portion is resting on the substantially flat surface. Other devices and systems are also disclosed.

4 Claims, 4 Drawing Sheets

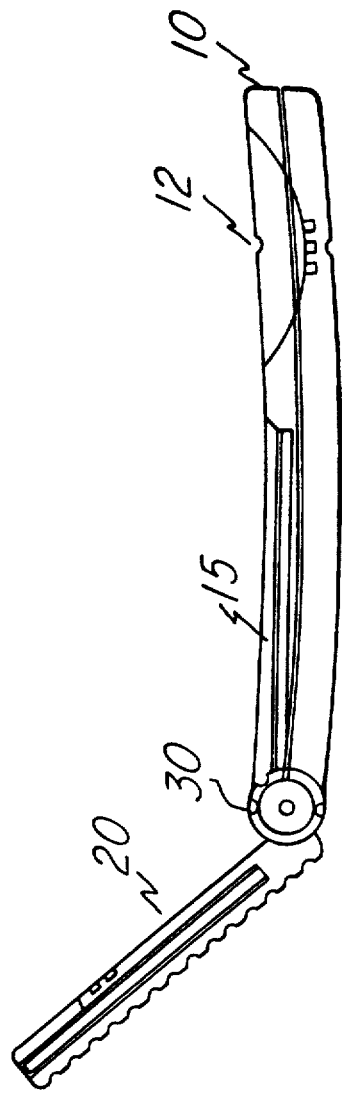
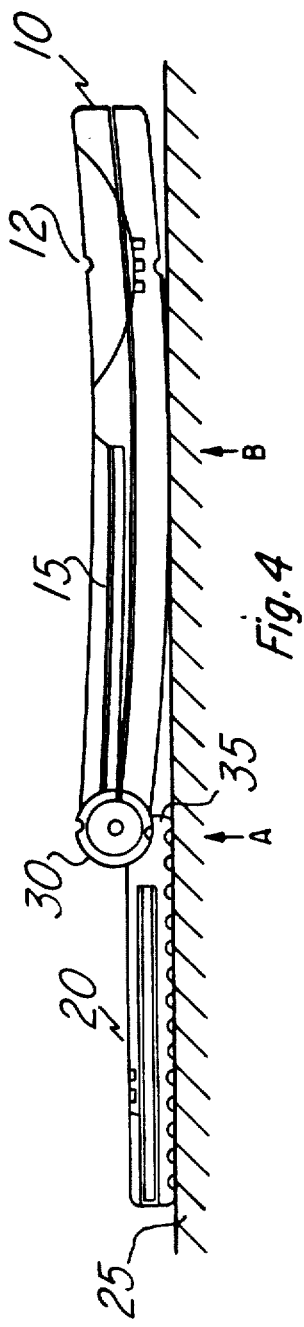
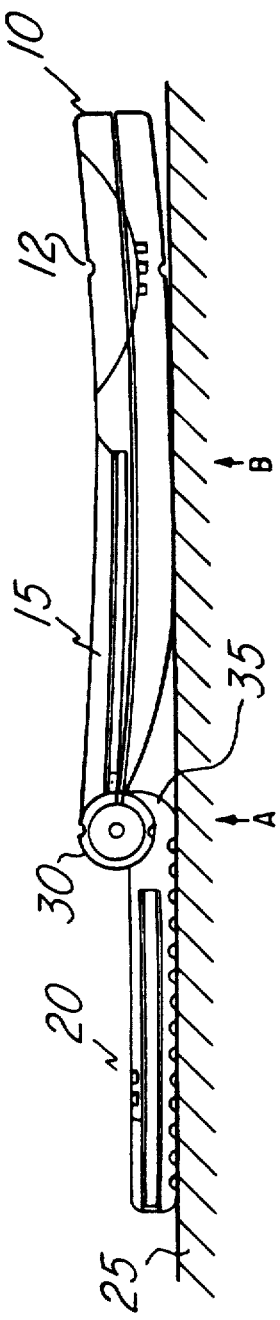

APPARATUS PROVIDING FOR A CURVED DEVICE WITH HINGED COVER

This application is a continuation of application Ser. No. 07/682,804, filed Apr. 8, 1991 now abandoned.

BACKGROUND OF THE INVENTION

Field of the Invention

This invention relates to ergonomics, and more particularly to a method and apparatus for providing stability for a curved device with a hinged cover.

Description of the Related Art

Without limiting the scope of the invention, its background is described in connection with telecommunication devices, strictly as an example, as there are many types of curved equipment that employ hinged covers.

Heretofore, portable telecommunication handsets, such as cellular phones, have had backs which were relatively flat. These handsets were flat to prevent the phone from rocking when the pushbuttons on the front phone were depressed while it was positioned on a flat surface.

Nevertheless, since human hands are curved, handsets with curved backs are more comfortable to use and easier to hold, from an ergonomics point of view, than handsets with flat backs. In designing such a handset, however, it was discovered that the unit rocked whenever a location on the front side of the handset were depressed while the unit were supported by a relatively flat surface. Accordingly, improvements which overcome this problem is presently desirable.

SUMMARY OF THE INVENTION

In view of the above problem associated with the related art, it is an object of the present invention to provide an apparatus for providing stability for a curved device with a hinged cover.

Another object of the present invention is to provide a stable curved apparatus enabling one to use the apparatus while it is positioned on a relatively flat surface without the apparatus rocking or shifting.

A further object of the present invention is to provide an apparatus which keeps the back of a curved telecommunications device from rocking or shifting whenever a user presses on the top surface of the curved device while it is positioned on a relatively flat surface.

These and other objects are accomplished in a preferred embodiment by providing a curved apparatus which remains stable when placed on a substantially flat surface. The curved apparatus has a substantially flat surface, a base portion with an arcuately shaped back surface capable of resting on a substantially flat surface, a hinge rotatably fixed to the base portion, and a cover secured to the hinge and rotatable therewith, disposed on the flat surface to prevent rocking of the base portion when the base portion's front surface is touched while the base portion is resting on the substantially flat surface.

These and other features and advantages of the invention will be apparent to those skilled in the art from the following detailed description of preferred embodiments, taken together with the accompanying drawings, in which:

BRIEF DESCRIPTION OF THE DRAWINGS

FIG. 3 is a side view of the device of FIG. 1, in its "talk" position;

FIG. 4 is a side view of the device of FIG. 1, in its "open" position;

FIG. 5 is an alternative side view of the device of FIG. 4, according to a preferred embodiment of the present invention.

Corresponding numerals and symbols in the different FIGURES refer to corresponding parts unless otherwise indicated.

DETAILED DESCRIPTION OF PREFERRED EMBODIMENTS

While numerous and varied apparatus which are normally operated while positioned on relatively flat surfaces, such as calculator type devices, portable video games, etc., would benefit from the present invention, the following description will detail an example apparatus from the telecommunications area in demonstrating preferred embodiments.

Figure 1:
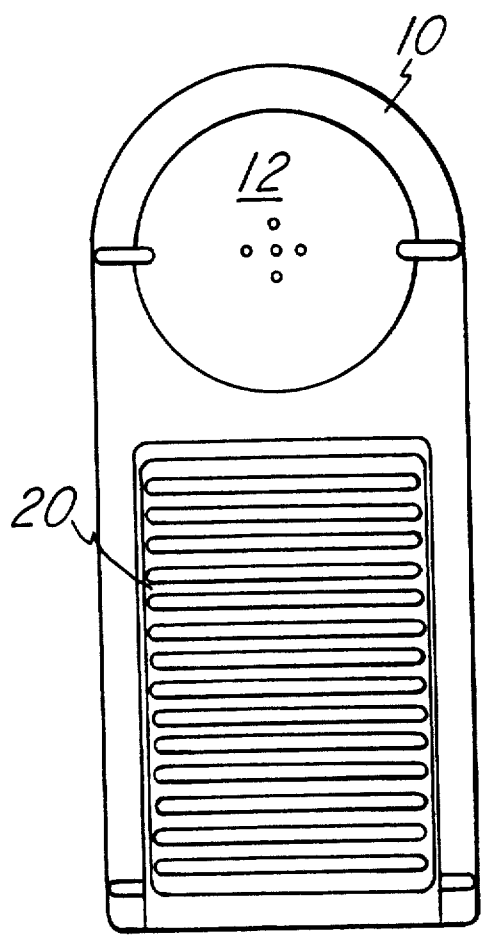
FIG. 1 is a front perspective view of a telecommunications device according to a preferred embodiment of the present invention.

Looking now at FIG. 1, which shows an example of a telecommunications device according to a preferred embodiment of the present invention. Handset 10 includes receiver 12 and LCD display area screen 15 (not shown). LCD cover 20 protects LCD screen 15 when handset 10 is not in use.

Figure 2:
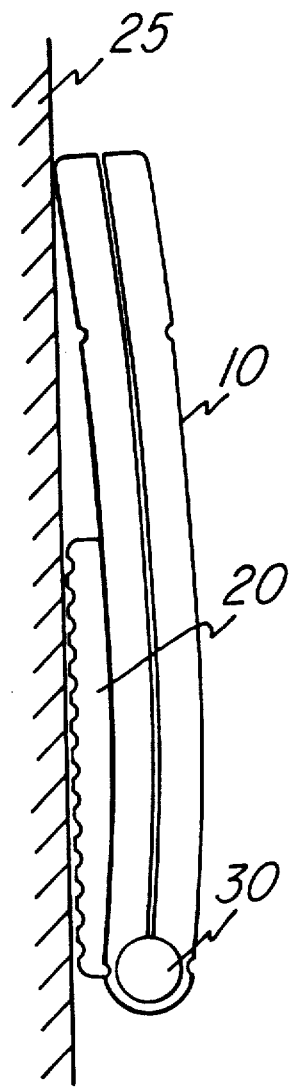
FIG. 2 is a side view of the device of FIG. 1, in its "closed" position.

FIG. 2 shows a side view of handset 10, in its "closed" position, resting face-down on surface 25. As can be seen, handset 10 is preferably arcuately shaped. Hinge 30 connects handset 10 to LCD cover 20. FIG. 3 depicts an alternative side view of handset 10, this time with LCD cover 20 in its "talk" position. When configured in this fashion, one may use handset 10 as a telephone.

Looking now at FIG. 4, handset 10 is again resting on surface 25. This time, however, LCD cover 20 is in its "open" position, and handset 10 is laying on its back, with LCD screen 15 exposed. As can be seen, end 35 of LCD cover 20 is even with the center of hinge 30. FIG. 4 demonstrates the spatial relationship between hinge 30 and surface 25 upon which it rests, as well as how the invention prevents rocking or shifting by handset 10, namely the provision of two points of contact (A and B) to support handset 10.

FIG. 5 shows an alternative embodiment to that seen in FIG. 4, namely handset 10 is more sharply curved and LCD cover 20 connects to hinge 30 such that end 35 extends beyond hinge 30. Again, rocking or shifting of handset 10 is prevented by the provision of two points of contact (A and B). It should be noted that the combination achieved by making handset 10 more or less arcuate, together with the exact position of end 35 is determined by aesthetics and should in no way limit the present invention. Additionally, receiver 12 and LCD screen 15, as shown in FIGS. 3-5, are provided strictly for perspective and ease of understanding.

It can be seen that according to a preferred embodiment of the present invention, LCD cover 20 of curved handset 10 pivots about point A such that LCD cover 20 supports handset 10 while allowing it to lay on a flat surface, such as a tabletop or dashboard, without rocking or movement. When handset 10 is laid on relatively flat surface 25 and LCD cover 20 opened all the way, LCD screen 15 is exposed on the top surface, while the back of handset 10 is curved. Without the present invention, the handset will rock. Thus, according to the present invention, when someone presses desired locations on the top surface of handset 10, most likely on LCD screen 15, while handset 10 is laying flat (in its "open" position) on surface 25, it does not rock or shift. The opened LCD cover 20 supports curved handset 10 by providing two points at which handset 10 would touch surface 25, at point A corresponding to hinge 30 and at point B corresponding to the curved back of handset 10.

Figure 6A:
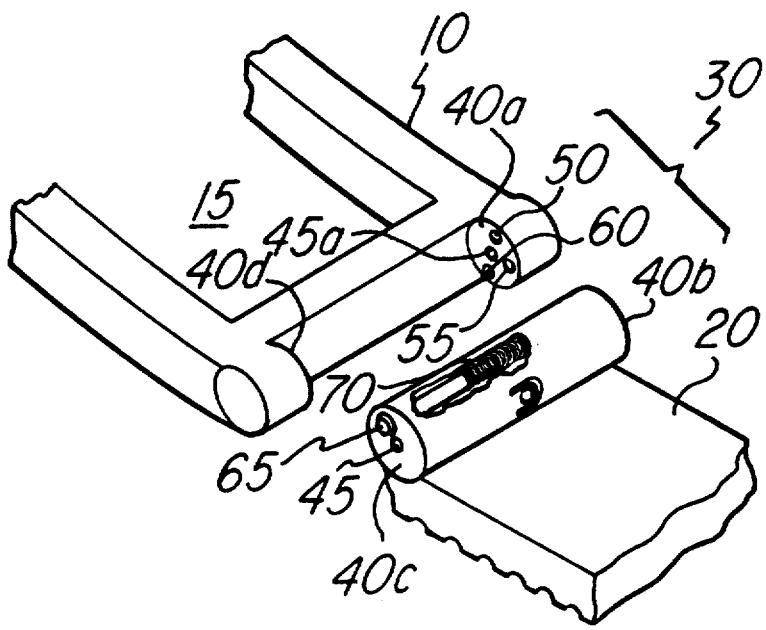
FIGS. 6a-b are perspective views of the hinge area of a device built pursuant to a preferred embodiment of the present invention.
Figure 6B:
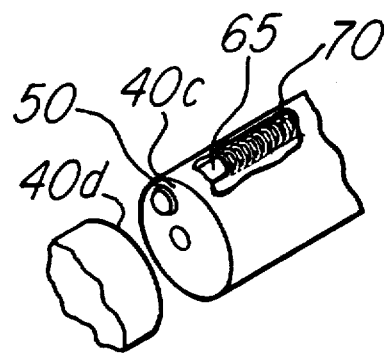

Moving now to FIGS. 6a-b, hinge 30 is shown in greater detail. FIG. 6a depicts cover 20 separated from handset 10 to show the inner workings of hinge 30. Hinge ends 40a,d are identical and are situated on handset 10; similarly, identical hinge ends 40b,c are part of cover 20. Hinge end 40a is shown bearing hinge axis 45 and three indents 50,55,60 into which pin 65 extends. Cover 20 bears pin 65 which engages indents 50,55,60 when cover 20 is moved circumferentially about hinge axis 45, thus enabling LCD cover 20 to lock into desired fixed positions as it rotates. Pin 65, which is shown only on hinge end 40c, because it cannot be seen in FIG. 6a on hinge end 40b, is held in engagement with the surface of hinge end 40, and indents 50,55,60 as they are encountered, by spring mechanism 70.

Each indent corresponds to a particular desired position at which cover 20 will stop. Indent 50 corresponds to the "closed" position seen in FIG. 2, indent 55 corresponds to the "talk" position of FIG. 3, while indent 60 corresponds to the "open" position depicted in FIGS. 4 or 5. At this point it should be noted that the number of indents is based upon the desired closed and opening positions, is a matter of choice or preference, and should not limit the scope of the present invention.

Continuing with FIG. 6b, hinge ends 40c,d are shown in fragmented perspective to demonstrate spring mechanism 70 holding pin 65 in direct engagement with indent 50. When such is the case, cover 20 is held in its "closed" position.

Figure 7:
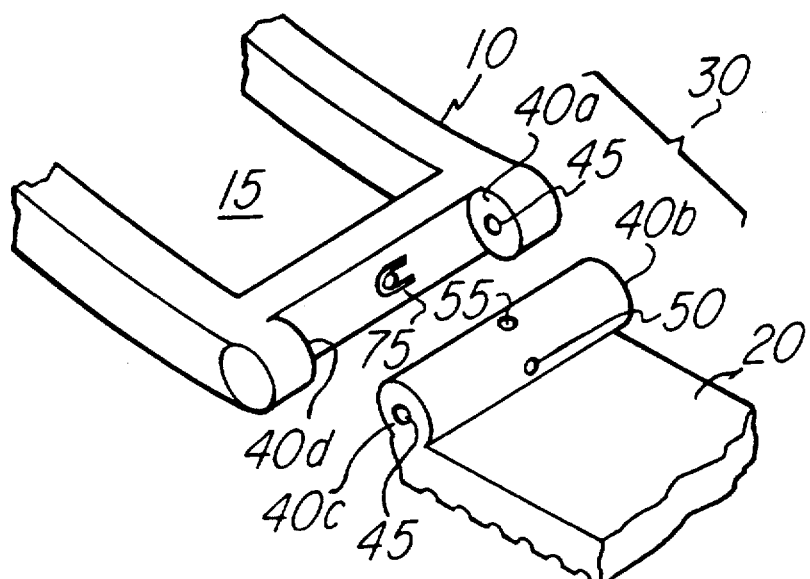
FIG. 7 is a perspective view of the hinge area of a device built according to an alternative embodiment of the present invention.

Hinge 30 may also be aided by a cam or some other means that interupts cover 20 at least one preselected position during its rotational movement, rather than spring mechanism 70 and pin 65. FIG. 7 depicts yet a further alternate hinge according to a preferred embodiment of the present invention. Projection 75, positioned on handset 10, engages with indents 50,55,60 located on cover 20 (indent 60 cannot be seen in FIG. 7 as drawn). Projection 75 is a resilient "bump" that remains in contact with hinge 30 as cover 20 rotates. Although not shown, it is also possible for projection 75 to be located on cover 20, with indents 50,55,60 positioned on handset 10.

It should be realized that although the preferred embodiments shown herein involve telecommunication devices, the present invention would be applicable to any other curved product that needs to lie on a relatively flat surface without rocking, such as calculators, small notebook-sized computers, portable game processors, portable monitors, appliances, etc.

While a specific embodiment of the invention has been shown and described, various modifications and alternate embodiments will occur to those skilled in the art. Accordingly, it is intended that the invention be limited only in terms of the appended claims.

I claim:

1. A portable telephone encasement which remains stable when placed on a substantially flat surface, comprising:
   a base portion with an arcuately shaped back surface resting on said substantially flat surface, the base portion including a telephone receiver;
   a hinge rotatably fixed to said base portion;
   a cover secured to said hinge and rotatable therewith, disposed on said flat surface to prevent rocking of said base portion when said base portion's front surface is touched while said base portion is resting on said substantially flat surface; and
wherein said hinge further comprises:
   a first portion bearing an extendable pin;
   a second portion in rotatable engagement with said first portion, bearing a plurality of indents to receive said extendable pin, and
   wherein said extendable pin causes said cover to lock in a fixed position whenever it encounters one of said plurality of indents.

2. The portable telephone encasement of claim 1, wherein said extendable pin is extended by a spring mechanism.

3. A curved hand holdable communication device comprising:
   a hand holdable base portion with an arcuately shaped back surface;
   a hinge rotatably fixed to said hand holdable base portion;
   a cover secured to said hinge and rotatable therewith, to prevent rocking of said hand holdable base portion when said hand holdable base portion is not held, but rather lies on it's arcuately shaped back surface on a substantially flat surface; and
wherein said hinge further comprises:
   a first portion bearing a resilient projection;
   a second portion in rotatable engagement with said first portion, bearing a plurality of indents to receive said resilient projection, and
   wherein said resilient projection causes said cover to lock in a fixed position whenever it encounters one of said plurality of indents.

4. A telephone apparatus, comprising:
   a curved handset having a receiver and a display screen;
   a cover for covering the display screen when the cover is closed; and
   a hinge connected to an end of the curved handset and connected to the cover, the hinge including an extendable pin and an indent to receive the extendable pin, the extendable pin expanding into the indent when the cover is opened to lock the cover in place.

* * * * *